US011177657B1

(12) United States Patent
Khatib et al.

(10) Patent No.: US 11,177,657 B1
(45) Date of Patent: Nov. 16, 2021

(54) UNIVERSAL POWER FLOW DYNAMIC SIMULATOR

(71) Applicant: Schweitzer Engineering Laboratories, Inc., Pullman, WA (US)

(72) Inventors: Abdel Rahman Khatib, Pullman, WA (US); Niannian Cai, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/032,404

(22) Filed: Sep. 25, 2020

(51) Int. Cl.
*H02J 3/00* (2006.01)
*H02J 3/46* (2006.01)

(52) U.S. Cl.
CPC ............... *H02J 3/004* (2020.01); *H02J 3/46* (2013.01); *H02J 2203/20* (2020.01)

(58) Field of Classification Search
CPC .......... H02J 3/004; H02J 3/46; H02J 2203/20
USPC ....................................................... 700/286
See application file for complete search history.

(56) References Cited

U.S. PATENT DOCUMENTS

| | | | |
|---|---|---|---|
| 3,849,637 A | 11/1974 | Caruso | |
| 4,916,328 A | 4/1990 | Culp | |
| 5,436,510 A | 7/1995 | Gilbert | |
| 6,204,642 B1 | 3/2001 | Lawson | |
| 6,492,801 B1 | 12/2002 | Sims | |
| 6,608,635 B1 | 8/2003 | Mumm | |
| 7,356,422 B2 | 4/2008 | Schweitzer | |
| 7,698,233 B1 | 4/2010 | Edwards | |
| 7,856,327 B2 | 12/2010 | Schweitzer | |
| 8,131,383 B2 | 3/2012 | Pearson | |
| 8,248,060 B2 | 8/2012 | Schweitzer | |
| 8,604,803 B2 | 12/2013 | Dooley | |
| 8,606,372 B1 | 12/2013 | Harris | |
| 8,744,638 B2 | 6/2014 | Tyagi | |
| 9,257,833 B2 | 2/2016 | Allen | |
| 9,519,301 B2 | 12/2016 | Bartlett | |

(Continued)

FOREIGN PATENT DOCUMENTS

| | | |
|---|---|---|
| CN | 101545953 | 1/2011 |
| DE | 10200733 | 7/2003 |
| EP | 1381132 | 9/2010 |

OTHER PUBLICATIONS

Kai Sun, Da-Zhong Zheng, and Qiang Lu, "Splitting Strategies for Islanding Operation of Large-Scale Power Systems Using OBDD-based methods," in IEEE Transactions on Power Systems, vol. 18, No. 2, pp. 912-923, May 2003.

(Continued)

*Primary Examiner* — Jigneshkumar C Patel
(74) *Attorney, Agent, or Firm* — Bradley W. Schield

(57) ABSTRACT

A power system simulator may calculate mechanical power of at least one generator at a second time in a simulated power system based at least in part on electrical power of the at least one generator at a first time. The power system simulator may calculate system frequency at second time based on system dynamic model that models the electrical power and the mechanical power of the simulated power system, frequency and voltage characteristics in the simulated power system, and inertia of the at least one generator. The power system simulator may provide simulated power system measurements based on the active power values to a power system controller to allow testing of the power system controller.

19 Claims, 4 Drawing Sheets

(56) References Cited

U.S. PATENT DOCUMENTS

| | | |
|---|---|---|
| 10,763,695 B2 | 9/2020 | Khatib |
| 2002/0091503 A1 | 7/2002 | Carrillo |
| 2003/0042876 A1 | 3/2003 | Sadafumi |
| 2003/0088809 A1 | 5/2003 | Gulati |
| 2004/0124812 A1 | 7/2004 | Delmerico |
| 2004/0164717 A1 | 8/2004 | Thompson |
| 2005/0285574 A1 | 12/2005 | Huff |
| 2007/0162189 A1 | 7/2007 | Huff |
| 2007/0168088 A1 | 7/2007 | Ewing |
| 2007/0219755 A1 | 9/2007 | Williams |
| 2007/0239372 A1 | 10/2007 | Schweitzer |
| 2007/0239373 A1 | 10/2007 | Nasle |
| 2008/0074810 A1 | 3/2008 | Guzman-Casillas |
| 2009/0085407 A1 | 4/2009 | Venkatasubramanian |
| 2010/0312414 A1 | 12/2010 | Kumar |
| 2011/0004425 A1 | 1/2011 | Schweitzer |
| 2011/0022245 A1 | 1/2011 | Goodrum |
| 2011/0054709 A1 | 3/2011 | Son |
| 2011/0320058 A1 | 12/2011 | Rietmann |
| 2012/0022713 A1* | 1/2012 | Deaver, Sr. ............ G05B 17/02 700/298 |
| 2012/0123602 A1 | 5/2012 | Sun |
| 2012/0232710 A1 | 9/2012 | Warner |
| 2012/0303170 A1* | 11/2012 | Tomita ...................... H02J 3/14 700/286 |
| 2012/0310434 A1 | 12/2012 | Taft |
| 2012/0310559 A1 | 12/2012 | Taft |
| 2013/0035885 A1 | 2/2013 | Sharon |
| 2013/0074513 A1 | 3/2013 | Mueller |
| 2013/0166085 A1 | 6/2013 | Cherian |
| 2014/0001847 A1 | 1/2014 | Khandelwal |
| 2014/0100705 A1 | 4/2014 | Shi |
| 2014/0316604 A1 | 10/2014 | Ortjohann |
| 2015/0008743 A1* | 1/2015 | Kimura ................... H02J 3/382 307/52 |
| 2015/0054339 A1 | 2/2015 | Zhao |
| 2015/0077133 A1 | 3/2015 | Fischer |
| 2015/0094871 A1 | 4/2015 | Bhageria |
| 2015/0241894 A1 | 8/2015 | Bartlett |
| 2015/0244170 A1 | 8/2015 | Bartlett |
| 2015/0244171 A1 | 8/2015 | Bartlett |
| 2017/0077700 A1 | 3/2017 | Sun |
| 2019/0258211 A1* | 8/2019 | Steurer ............. G05B 19/0423 |
| 2020/0026337 A1 | 1/2020 | Khatib |
| 2020/0227915 A1 | 7/2020 | Cai |
| 2020/0356128 A1 | 11/2020 | Cai |

OTHER PUBLICATIONS

Mark Grant, "Foxboro SCADA Systems Load Shedding and Electrical Monitoring Control Systems Design in Industrial Process Plants", 2012, retrieved on May 5, 2016 from http://iom.invensys.com/EN/pdfLibrary/WhitePaper_LoadSheddingandElectricalMonitoring.pdf.

Abdel Rahman Khatib, Mahipathi Appannagari, Scott Manson, and Spencer Goodall; "Load Modeling Assumptions: What is Accurate Enough?" 62nd Annual Petroleum and Chemical Industry Technical Conference, Houston, TX Oct. 5-7, 2015.

R. Mageshvaran and T. Jayabarathi, "GSO based optimization of steady state load shedding in power systems to mitigate blackout during generation contingencies," Ain Shams Engineering Journal, vol. 6, No. 1, pp. 145-160, Mar. 2015.

* cited by examiner

UNIVERSAL POWER FLOW DYNAMIC SIMULATOR

TECHNICAL FIELD

The present disclosure relates generally to power system simulation and, more particularly, to a dynamic model for simulating power flow of power systems.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION OF SPECIFIC EMBODIMENTS

Figure 1:
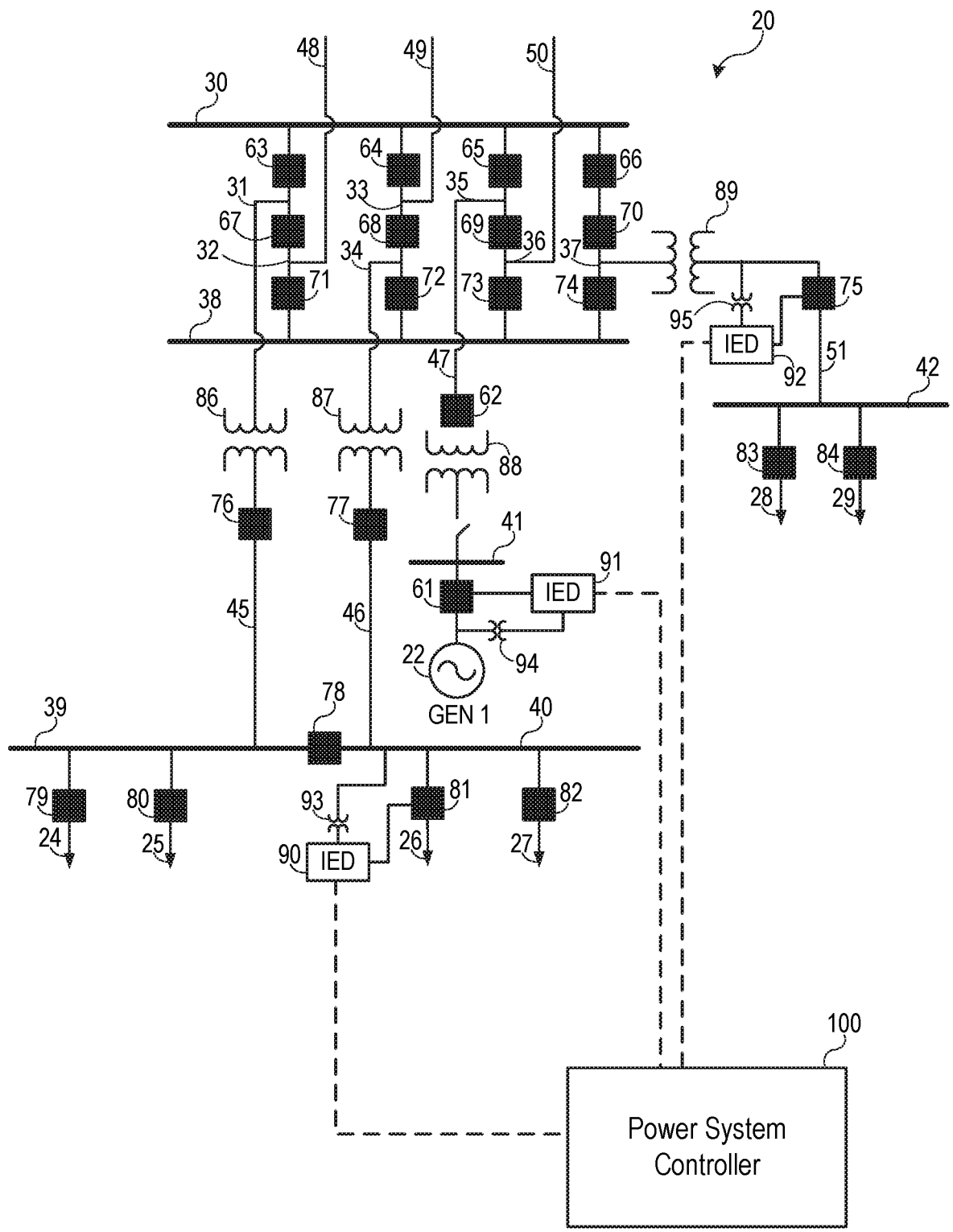
FIG. 1 is a one-line diagram of an electric power delivery system having intelligent electronic devices (IEDs) that monitor, control, and/or protect the electric power delivery system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems include equipment, such as generators, power lines, and transformers, to provide electrical energy from sources to loads. Transformers may be used in power systems to step-up or step-down voltages to suitable levels for power lines, buses, loads, or generators. Various intelligent electronic devices (IEDs) may be used in monitoring, control, and protection of the power delivery system. For example, IEDs may obtain voltage measurements and/or current measurements from the power system and trip circuit breakers (CBs) to isolate faults from the power system.

Further, IEDs may communicate with a power system controller to facilitate control of the power system. For example, the IEDs may provide the voltage measurements and/or current measurements of the power system and send the measurements to the power system controller. The power system controller may determine whether to shed load or shed generation on the power system to balance the power being generated with the power being consumed. By maintaining balance on the power system, reliability of the power system may be improved.

Power system simulators may be used to test the power system controller without affecting actual loads of a power system. Further, various contingencies may be simulated on the power system simulators to ensure sufficient responses by the power system controller. However, some simulators may simulate the steady state of the power system without allowing for simulation of dynamic conditions. Further, other simulators may use specialized hardware that allows for simulating the dynamic conditions, however, such specialized hardware may be costly and complex. As such, there is a need in the field to allow for simulating power system dynamics without such specialized power system simulation hardware.

As explained below, a power system simulator may be used to simulate power system measurements that reflect dynamic conditions of the power system. Further, the power system simulator may use several techniques to reduce the complexity of processing the dynamic conditions to allow for simulating power system conditions without dedicated or specialized power system simulation hardware (e.g., performed via a general-purpose microprocessor). For example, the power system simulator may calculate first active power flow values at each bus at a first time. The simulator may determine second active power flow values at each bus at a second time based on the mechanical power of each governor in the power system and the first active power flow values. The simulator may provide power system measurements to the control system based on the second active power flow values to allow for testing of the control system.

FIG. 1 is a one-line diagram of an electric power delivery system 20 that includes a distributed generator 22 that provides power to loads 24-29. The electric power delivery system 20 may include buses 30-42. The buses 30-42 may be connected to loads 24-29, generators 22, other buses via power lines 45-51, or other electrical equipment. CBs 61-84 may be used to electrically connect or disconnection portions of the electric power delivery system 20. The power system 20 includes transformers 86-89, such as step-up or step-down transformers, that step up or step down voltages between the buses 40-44. Although illustrated in single-line form for purposes of simplicity, power system 20 may be a multi-phase system, such as a three-phase electric power delivery system. Further, any suitable number of power sources, loads, buses, transformers, and other electrical equipment may be used in different power systems. As illustrated, the electric power delivery system 20 may be a microgrid that is connected to a macrogrid or to another microgrid via the power lines 48-50.

The electric power delivery system 20 may be monitored, controlled, and/or protected by IEDs 90-92. As used herein, an IED (such as IEDs 90-92) may refer to any microprocessor-based device that monitors, controls, automates, and/or protects monitored equipment within the power system 20. Such devices may include, for example, remote terminal units, differential relays, transformer relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

IEDs 90-92 may obtain power system measurements from the field using voltage transformers (VTs) 93-95, current transformers (CTs), and the like. The IEDs 90-92 may detect fault events in the power system 20 using voltage signals of the VTs 93-95 and/or current signals of CTs. When a fault occurs on a power line 45-51, the IEDs 90-92 may detect the event on the power line via the voltage signals and/or the current signals.

The IEDs 90-92 may send a signal to the CBs 61, 75, and 81 to trip the CBs, thereby disconnecting portions of the electric power delivery system 20. For example, the IEDs 90-92 may trip CBs 61, 75, and 81 due to current measurements exceeding a threshold overcurrent, voltages of buses 40 and 41 falling below a threshold, a threshold current-over-time, or the like.

In addition to protection from faults and other events, the IEDs 90-92 may perform control operations, such as load shedding or generation shedding, to improve reliability of the electric power delivery system 20. A power system controller 100 may receive power system measurements from the IEDs 90-92, monitor the electric power delivery system 20, and send control signals to the IEDs 90-92 based on the electrical characteristics of the electric power delivery system 20. For example, if the loads 24-29 are consuming an amount of power greater than the generator 22 is designed to provide, the power system controller 100 may determine that the electric power delivery system 20 has an underfrequency condition in which the desired frequency on the power system 20 has decreased below a threshold. The power system 100 may detect such a condition and send a control signal to the IED 90 to cause the IED 90 to trip the CB 81, thereby shedding the load 26 to balance the power generated with the power being consumed. Such contingencies may be difficult to test in an actual power system because it may be impractical to place several loads and generators off-line to reproduce test situations. As such, power system controllers may be tested using simulators for hardware-in-the-loop testing in which the hardware of the power system controller is connected to corresponding connections of a simulator to receive simulated power system measurements in place of IED power system measurements.

Figure 2:
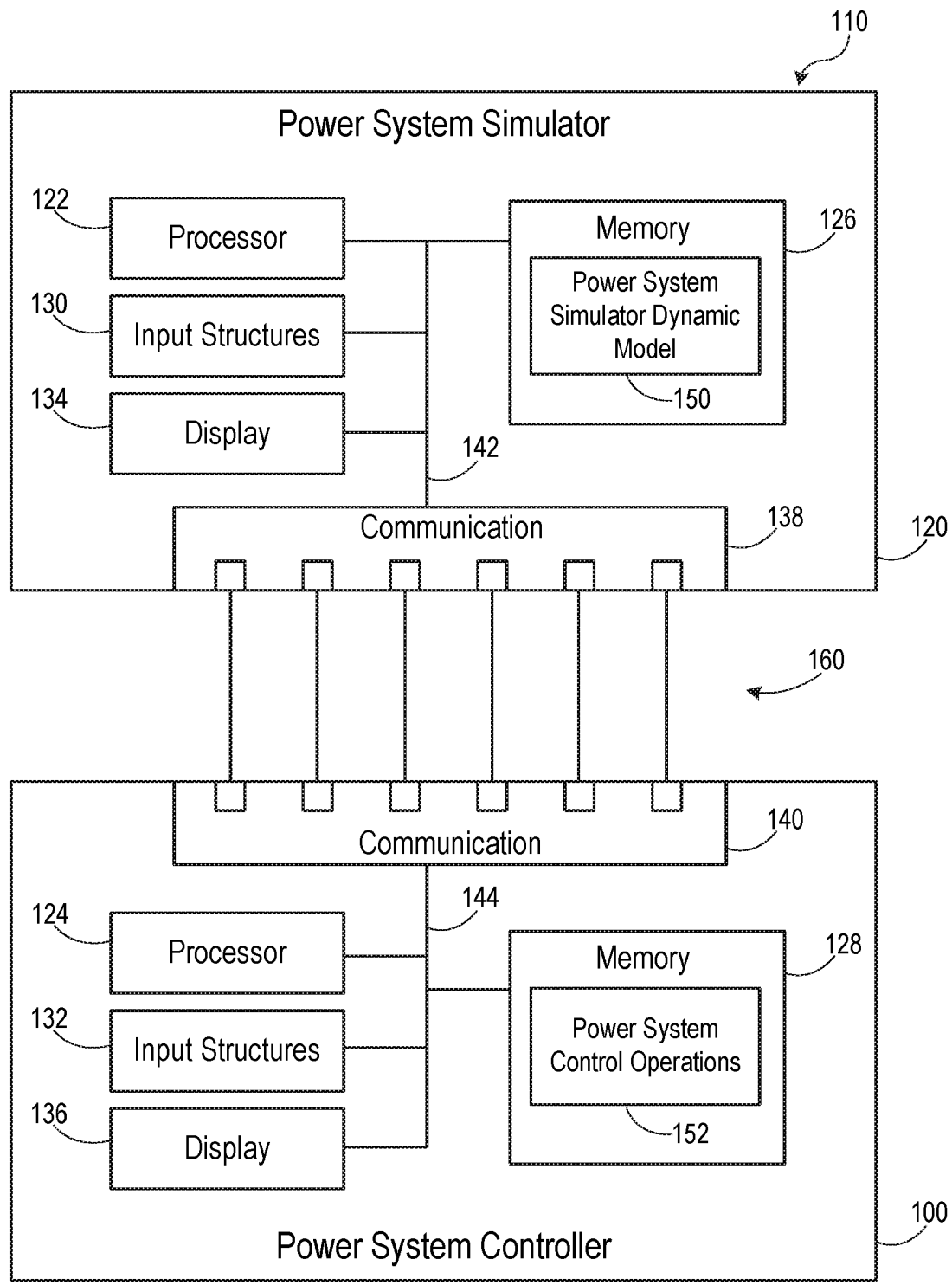
FIG. 2 is a block diagram of a power system controller that controls operation of the power system of FIG. 1 via the IEDs, in accordance with an embodiment.

FIG. 2 is a block diagram of a test setup 110 of a power system controller 100 being tested using a power system simulator 120. As illustrated, the power system controller 100 and the power system simulator 120 may each include one or more processors 122 and 124, a computer-readable medium (e.g., memory 126 and 128), input structures 130 and 132, a display terminal 134 and 136, and a communication interface 138 and 140. Each of the components of the respective devices may be coupled to each other via one or more communication buses 142 and 144. The processors 122 and 124 may be embodied as a microprocessor, a general-purpose integrated circuit, an application specific integrated circuit (ASIC), a field programmable gate array (FPGA), and/or other programmable logic devices. It should be noted that the processor 122 and 124 and other related items in FIG. 2 (e.g., the memory 126 and 128) may be generally referred to herein as "processing circuitry." Furthermore, the processing circuitry may be a single contained processing module or may be incorporated wholly or partially within any of the other elements within the power system controller 100 and the power system simulator 120. It should be noted that FIG. 2 is merely one example of a particular implementation and is intended to illustrate the types of components that may be present in the power system controller 100 and the power system simulator 120.

The processors 122 and 124 may be operably coupled with the respective memory 126 and 128 to perform various algorithms. Such programs or instructions executed by the processors 122 and 124 may be stored in any suitable article of manufacture that includes one or more tangible, computer-readable media at least collectively storing the instructions or routines, such as the random-access memory and the read-only memory. For example, the power system simulator may include a power system simulator dynamic model that uses a set of power flow equations to model the state of the power system. Further, the power system controller 100 may include power system control operations 152 that send control signals to IEDs to control the power system, such as shedding load and/or generation.

In the illustrated embodiment, the power system controller 100 and the power system simulator 120 include input structures 130 and 132 (e.g., Universal-Serial-Bus (USB) ports, buttons) that allow an operator to provide inputs into the power system controller 100 and the power system simulator 120 and to display results of the simulation on the display terminals 134 and 136, change settings, etc. In some embodiments, the display terminals 134 and 136 may be touchscreen displays.

The power system controller 100 and the power system simulator 120 may be connected via the communication interfaces 138 and 140. The communication interfaces 138 and 140 may include fiber optic communication ports, ethernet ports, pins, or other connectors to allow the power system simulator 120 to send simulated power system measurements to the power system controller 100 and to receive control signals from the power system controller 100. For example, the connections 160 may correspond to the connections between the IEDs 90-92 and the power system controller 100 in the power system 20 of FIG. 1.

The power system controller 100 may receive power system measurements, such as voltage, current, frequency, Megawatt (MW), Megavolt-ampere reactive (MVAR), and CB status (e.g., open or closed), from the power system simulator 120 to simulate measurements obtained by the IEDs 90-92 in the field. Further, the power system controller 100 may perform the control operations as if the power system controller 100 were in the power system 20 and send control signals to the power system simulator 120. For example, the power system controller 100 may determine that an underfrequency condition is present and send a control signal to the power system simulator 120 indicating instructions that would cause the IED 90 to open the CB 81 as if the power system controller 100 were operating in the power system 20. To improve reliability of the power system controller 100, such conditions may be simulated to ensure that the power system controller 100 may operate as desired in the actual power system 20.

To test power system controllers, dedicated simulation hardware may be used for hardware-in-the-loop testing in which the dedicated hardware generates a mathematical simulation and provides electrical measurements to the power system controller being tested as if the power system controller were in an actual power system. To test transients of the power systems that are detectable at time intervals between measurements in the microsecond range, the dedicated simulation hardware may be customized to calculate parts of the simulation in parallel. However, this specialized simulation hardware may be costly and complex, which may be impractical for certain electric power delivery systems. Further, while steady state simulators may be used, these simulators may not simulate dynamics of a power system. That is, steady state simulators may not allow for dynamic frequency testing, such as underfrequency load shedding testing or overfrequency generation shedding testing. As set forth below, a dynamic active power simulator may be used for testing of power system dynamics without dedicated simulation hardware.

A combination of techniques may be used to reduce processing and complexity of the power system to allow for simulating a power system dynamic model. For example, the generators on the same island may be simulated as frequency coherent (i.e., set to have the same frequency). Further, exciter and voltage transients may be not be simulated due to occurring outside of the dynamics time intervals (e.g, 10 milliseconds, 50 milliseconds, 100 milliseconds, 150 milliseconds, 200 millesconds, 500 milliseconds, or slower). The power system dynamic model may be simulated without accounting for the difference between mechanical frequency and electrical frequency of a generator to simplify the power system dynamic model. In some embodiments, generator terminal voltage may be considered as a constant and may limited to changing in steady state based on exciter control philosophy. While these are used as examples of simplifications that may be applied individually or in combination, any suitable combination of simplifications may be used to reduce the processing and complexity of the power system dynamic model. By simplifying the power system dynamic model, the power system simulation may be performed on a power system simulator without specialized simulation hardware. For example, the power system simulator may be performed on processing circuitry with a general-purpose microprocessor that does not include hardware designed for simulations.

The system frequency may be calculated using the mechanical power and inertia of the connected generators, load frequency and voltage characteristics, and system active power flow model. The system frequency may be calculated as by modeling the system active power dynamics. The system active power dynamic may be modeled as:

$$\sum_{j=1}^{N_{Gi}} Pm_{j,i} = \sum_{j=1}^{N_{Gi}} 2*H_j \frac{df}{dt} + g_i^p(f,V)P_{Load_i} + |V_i|\sum_{n=1}^{N}|Y_{in}||V_n|\cos(\delta_i - \delta_n - \theta_{in})$$

Eq. 1 where $N_{Gi}$ is the number of generators connected to bus i; $Pm_{j,i}$ is the mechanical power input of generator j which is connected to bus i; $H_j$ is the inertia of generator j; f is system frequency; $g^p_i$ is frequency and voltage dependent function of active power load; $Pload_i$ is the active power load connected to bus i at nominal frequency and voltage; $|V_i|$ and $|V_n|$ are bus voltage magnitude of bus i and bus n; $|Y_{in}|$ and $\theta_{in}$ are the magnitude and angle of $Y_{in}$, the (i,n)th element of bus admittance matrix.

In some embodiments, the active power may be dynamically modeled while reactive power may be modeled as steady state. The system reactive power may be modeled as:

$$\sum_{j=1}^{N_{Gi}} Q_{j,i}^{Ref} = \sum_{j=1}^{m} \frac{V_i - V_{j,i}^{Ref}}{R_{q_{j,i}}} +$$

Eq. 2

-continued $$g_i^q(V,f) \cdot Q_{Load_i} + |V_i|\sum_{n=1}^{N}|Y_{in}||V_n|\sin(\delta_i - \delta_n - \theta_{in})$$

where $Q_{j,i}^{Ref}$ is the reactive power reference of generator j that is connected to bus i; $V_{j,i}^{Ref}$ is the voltage reference of generator j that is connected to bus i; m is number of generators connected to bus i that are operated in voltage droop mode. $R_{q_{j,i}}$ is the voltage droop value of generator j that is connected to bus i; $g^q_i$ is the frequency and voltage dependent function of reactive power load; $QLoad_i$ is the reactive power load connected to bus i at nominal frequency and voltage.

The details of the governor dynamic model may depend on the manufacture of the particular governor in the power system. Generally, a governor may use measurement of frequency and active electrical power to control mechanical power inputs. Therefore, the governor may be modeled as:

$$Pm = Governor(Pe, f)$$

Eq. 3 where Pm is the mechanical power of a generator, Pe is the electrical power of a generator, and f is the frequency.

The dynamic power system simulator 120 may calculate the power system state of each bus at a first time (t). For example, an initial steady state calculation of active power flow of each of the buses may be performed to initialize the dynamic simulator. The power system simulator 120 may calculate the status of a power system at each step (Δt) based on the dynamic model.

Figure 3:
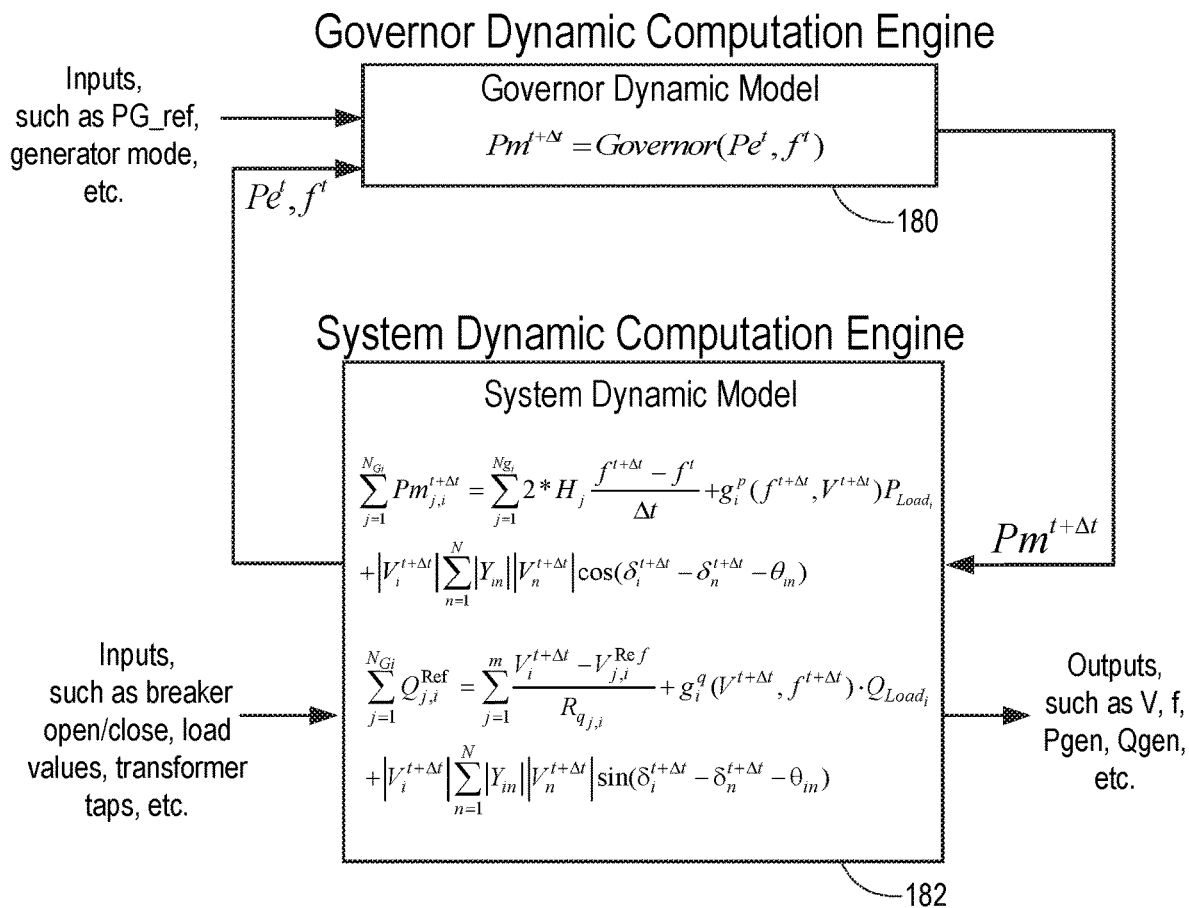
FIG. 3 is a computational diagram of a universal power flow dynamic simulator used to simulate operating conditions of the power system controller, in accordance with an embodiment.

FIG. 3 is a computational diagram of a process 178 that may be performed by the power system simulator 120 to model the active power flow values at each bus at time t+Δt. Instructions (e.g., code) may be stored in the memory 126 and executed by the processor 122 of the power system simulator 120 to cause the operations described in the process 178. As mentioned above, the processor 122 may calculate electric power generation ($Pe^t$) at the first time t, for example, using the steady state calculations of power flow values to initialize the dynamic simulator or using values from the previous calculation of dynamic active power flow. Further, the frequency $f^t$ at the first time may be obtained. As mentioned above, the time interval (Δt) between the first time and a second time may be in the millisecond range to allow for assessment of dynamics of the active power of the system. The process 178 may begin by calculating the mechanical power at a second time (t+Δt).

$$Pm^{t+\Delta t} = Governor(Pe^t, f^t)$$

Eq. 4

As illustrated in FIG. 3, the power system simulator may include a governor dynamic computation engine (GDCE), which may include calculations to model the mechanical power at the second time ($Pm^{t+\Delta t}$) based on the physical characteristics of the governor of the generator 22 defined by the Governor function, the electrical power of the generator $Pe^t$ at the first time, and the frequency $f^t$ at the first time. For example, the simulator may receive inputs, such as generator active power reference (PG_ref), generator mode (e.g., droop, isochronous, constant power, etc.), generator runback signal (if applicable), etc to use in the mechanical power computation. The inputs used to calculate the mechanical power at time t+Δt may depend on the particular generator of the power system.

The power system simulator 120 may include a system dynamic computation engine (SDCE) that calculates the system dynamic frequency response of the power system 20 using a system dynamic model. The system dynamic model involves calculating system frequency at second time using the mechanical power of equation 4 at the second time, frequency and voltage dependent active load values, and active power flow model.

$$\sum_{j=1}^{N_{Gi}} Pm_{j,i}^{t+\Delta t} = \sum_{j=1}^{N_{gi}} 2*H_j \frac{f^{t+\Delta t} - f^t}{\Delta t} + g_i^p(f^{t+\Delta t}, V^{t+\Delta t})P_{Load_i} +$$
$$|V_i^{t+\Delta t}|\sum_{n=1}^{N}|Y_{in}||V_n^{t+\Delta t}|\cos(\delta_i^{t+\Delta t} - \delta_n^{t+\Delta t} - \theta_{in})$$

Eq. 5

The power system simulator 120 may utilize equation 5 to solve for the system frequency at the second time ($f^{t+\Delta t}$) using the system dynamic model. The mechanical power at the second time may be approximated as a summation of the inertia and the derivative of the frequency with respect to time (e.g., using the frequency at the first time ($f^t$), load frequency and voltage characteristics of the loads ($g_i^p$), and the steady state universal power flow from the admittance matrix. The power system simulator 120 may solve for the system frequency at the second time by setting the mechanical power at the second time to be how the generators respond between the first time and the second time due to inertia, how the loads respond between the first time and the second time due to the characteristics of the loads, and the steady state response of the power system.

The load frequency and voltage characteristics may be equations that estimate the load characterization based on prior or modeled frequency and voltage changes. For example, whether the loads have been historically more resistive, more inductive, etc, may be calculated based on prior measurements of the power system and included in the load frequency and voltage characteristics of the loads. The inertia and the derivative of the frequency may be numerically integrated (i.e., summed). The inertia of the generator and the derivative of frequency with respect to time may be referred to as a dynamic component of the active power system model, and the admittance matrix may be referred to as a steady state component of the active power system model. By including a dynamic component in the active power system model, the dynamics of the power system may be analyzed and tested in addition to the steady state response.

The SDCE may receive field inputs, breaker open/close signals, load values, transformer taps, etc. The field inputs may be received from the power system controller 100, the previous calculations of the model, a particular condition of occurring in the simulation (e.g., due to a contingency), or the like. For example, a contingency may be tested with the power system simulator 120 in which a CB is open to lose utility connection.

The power system simulator 120 may generate outputs, such as voltages, frequencies, active power generation, reactive power generation, and the like, based on the calculated system dynamic response. The outputs may be communicated to the power system controller 100 via the communication interfaces 138 and 140 to represent the power system measurements as if the values were obtained from the field (e.g., from IEDs 90-92). Further, the SDCE may provide electrical power of the generator and frequency of the power system to the GDCE. The second time may be updated to be the next step in time, and the process 178 may begin again.

The power system simulator 120 may perform the process 178 described in FIG. 3 at each step in time to allow assessment of dynamics of the active power in the power system. Calculations of the power system using the process 178 may be limited by the speed of the processing circuitry and/or the complexity of the power system. To expediate the computation, a technique may be used in which buses with relatively low (e.g., negligible) line impedance between each other in relation to other line impedances of the power system may be grouped into a super node to simplify topology (e.g., connections between buses) of the power system.

Figure 4:
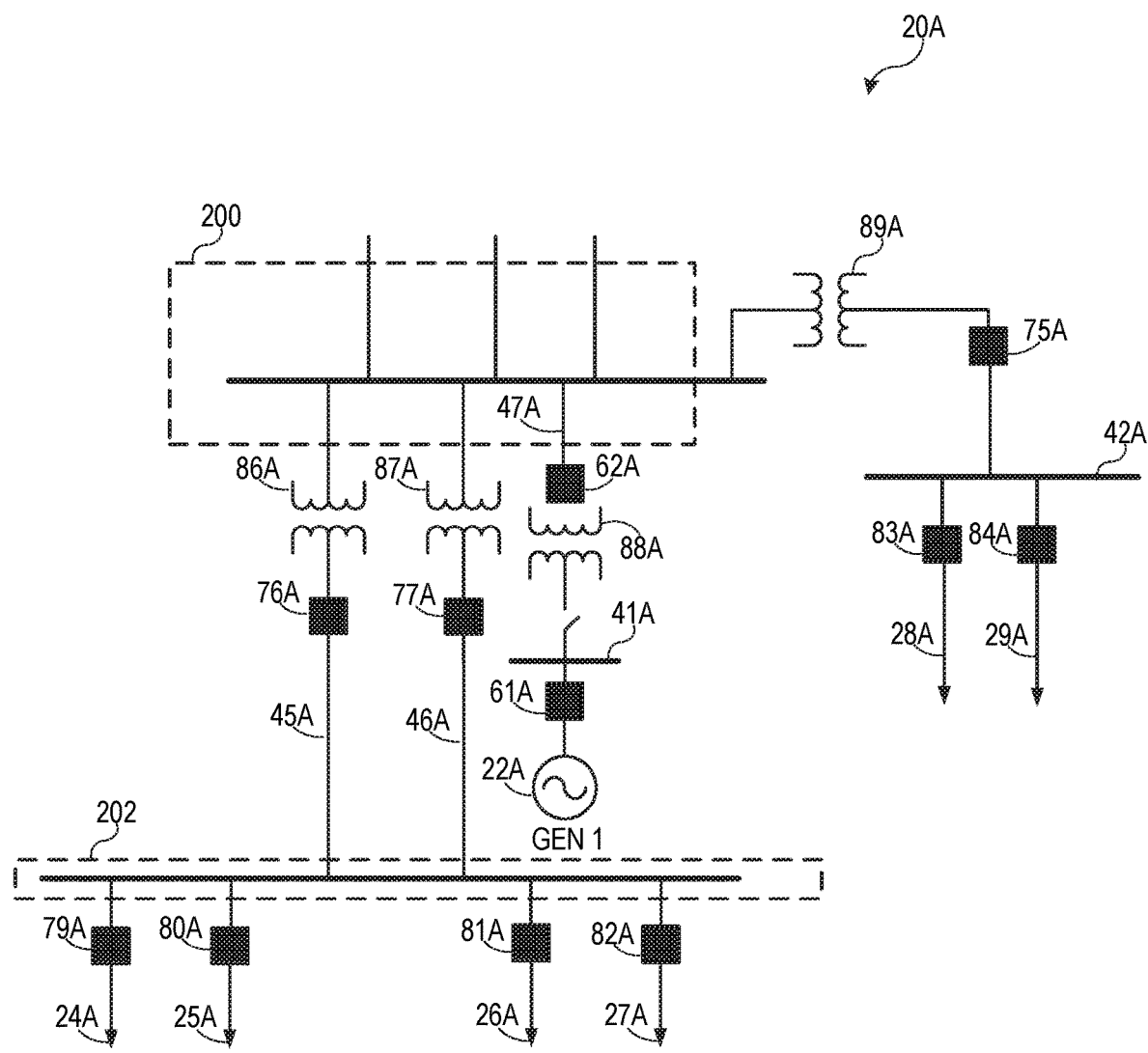
FIG. 4 is a one-line diagram of a simplification of the electric power delivery system of FIG. 1 by grouping together parts as a super node, in accordance with an embodiment.

FIG. 4 is a one-line diagram of the power system 20 of FIG. 1 with a simplified topology using the super node technique to reduce complexity of the power system for simulating active power dynamics. In the illustrated embodiment, electrical equipment labeled with the suffix A refers to the corresponding numbering of electrical equipment in FIG. 1. If each of the CBs 61-84 where closed in FIG. 1 and the impedances of the breakers are considered low in relation to other impedances of the power system, buses 30-38 may be considered as a first super node 200 (or super bus) and buses 39 and 40 can also be considered a second super node 202 (or super bus). That is, the 13 bus system of FIG. 1 may be simplified to a 4-bus system of FIG. 4, which reduces the computation time of system dynamics. The power system simulator 120 may determine whether to form a super node based on percentages of the bus impedances with respect to the other bus impedances or some other technique. After the power system flow dynamics are obtained in each time step, unpacking calculations may be used to calculate the dynamic power flows of the branches inside each super node.

The processor 122 may select a reference bus with a per unit bus voltage magnitude |Vo| and angle zero. For each super node, the current injection into each bus may be calculated using:

$$I_{inject} \approx \frac{S_{inject}}{|V_o|}$$

Eq. 5 where $S_{inject}$ is the per unit apparent power injection vector to each bus inside the super node and $I_{inject}$ is the current injection vector to each bus inside the super node. Due to the impedances between each of the buses inside the super node being considered neglectable, the voltage magnitude of each bus may be close to each other. Therefore, the current injection to each bus may be approximated by the ratio between injected apparent power and reference voltage magnitude, and the voltage of the buses inside the super node may be calculated as:

$$V = Y^{-1} I_{inject}$$

Eq. 5 where V is the voltage vector of each bus inside the super node, Y is the Y bus matrix of the power system network inside the super node, and I is the current injection vector from equation 5. After the voltage is determined, the power flows of the branches inside the super node may be calculated.

The processor 122 may select a reference bus with a per unit bus voltage magnitude |Vo| and angle zero. For each super node, the current injection into each bus may be calculated using:

By combining nodes in the power system into super nodes, an amount of calculations performed to obtain the dynamic active power flow values may be reduced to numbers that may be performed without specialized hardware designed to compute power system equations. For example, the super nodes may reduce the number of calculations performed to allow general-purpose processing circuitry to obtain dynamic active power flow values to be used in simulating the power system.

As mentioned above, different contingencies may be tested on the power system controller 100 via the power system simulator 120. By testing the each of the contingencies, operators may ensure that the power system controller 120 may respond as desired, thereby improving the reliability of the power system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory, computer readable medium, comprising instructions configured to be executed by a processor to cause operations comprising:
    calculating mechanical power of at least one generator at a second time in a simulated power system based at least in part on electrical power of the at least one generator at a first time;
    calculating system frequency at the second time based on a system dynamic model that models the electrical power and the mechanical power of the simulated power system, load frequency and voltage characteristics of loads in the simulated power system, and inertia of the at least one generator, wherein the at least one generator is simulated as being frequency coherent with any other generators on an island of the simulated power system to reduce complexity of the simulated power system; and
    providing simulated power system measurements based on the system frequency to a power system controller to allow testing of the power system controller.

2. The non-transitory, computer-readable medium of claim 1, wherein the mechanical power of the at least one generator is set to be equal to the electrical power of the at least one generator.

3. The non-transitory, computer-readable medium of claim 1, wherein a time interval between the first time and the second time is set to allow for monitoring dynamics of the simulated power system without monitoring exciter and voltage transients.

4. The non-transitory, computer-readable medium of claim 3, wherein the time interval is 100 milliseconds or slower to exclude monitoring of exciter and voltage transients in monitoring dynamics of the simulated power system.

5. The non-transitory, computer-readable medium of claim 1, wherein the instructions are configured to be executed by the processor to cause operations comprising calculating the mechanical power of the at least one generator by modeling a governor of the at least one generator.

6. The non-transitory, computer-readable medium of claim 1, wherein the governor is modeled using the system frequency and the electrical power of the generator at the first time.

7. The non-transitory, computer-readable medium of claim 1, wherein the instructions are configured to be executed by the processor to cause operations comprising combining at least two buses in the simulated power system to form a super node to reduce computation time of determining the system frequency in the simulated power system.

8. A power system simulator, comprising:
    a non-transitory computer-readable medium; and
    a processor operatively coupled to the non-transitory computer readable medium, wherein the processor is configured to execute instructions stored on the non-transitory computer readable medium to cause operations comprising:
    calculating mechanical power of at least one generator at a second time in a simulated power system based at least in part on electrical power of the at least one generator at a first time, wherein a time interval between the first time and the second time is set to allow for monitoring dynamics of the simulated power system without monitoring exciter and voltage transients;
    calculating system frequency at the second time based on system dynamic model that models the electrical power and the mechanical power of the simulated power system, frequency and voltage characteristics of loads in the simulated power system, and inertia of the at least one generator; and
    providing simulated power system measurements based on the system frequency to a power system controller to allow testing of the power system controller.

9. The power system simulator of claim 8, wherein the processor is a general-purpose microprocessor configured to simulate active power dynamics of the simulated power system.

10. The power system simulator of claim 8, comprising a communication interface configured to receive communication signals from a power system controller as if the power system controller were in an actual power system corresponding to the simulated power system.

11. The power system simulator of claim 8, wherein the mechanical power of the at least one generator is set to be equal to the electrical power of the at least one generator.

12. The power system simulator of claim 8, wherein the at least one generator is simulated as being frequency coherent with any other generators on an island of the simulated power system to reduce complexity of the simulated power system.

13. The power system simulator of claim 8, wherein the system dynamic model has a dynamic component comprising the inertia of the at least one generator and a derivative of a frequency of the simulated power system with respect to time.

14. The power system simulator of claim 8, wherein the processor is configured to cause operations comprising:

determining that impedances between at least two buses of the simulated power system are below a threshold value; and combining the at least two buses to form a super node to reduce computation time of determining the active power values in the simulated power system.

15. A method, comprising:

calculating mechanical power of at least one generator at a second time in a simulated power system based at least in part on electrical power of the at least one generator at a first time; and calculating system frequency at second time based on system dynamic model that models the electrical power and the mechanical power of the simulated power system, frequency and voltage characteristics in the simulated power system, and inertia of the at least one generator, wherein the at least one generator is simulated as being frequency coherent with any other generators on an island of the simulated power system to reduce complexity of the simulated power system; and providing simulated power system measurements based on the system frequency to a power system controller to allow testing of the power system controller.

16. The method of claim 15, comprising:

determining that impedances between at least two buses of the simulated power system are below a threshold value; and combining the at least two buses to form a super node to reduce computation time of determining the active power values in the simulated power system.

17. The method of claim 16, comprising: combining the at least two buses based at least in part on a breaker status of a circuit breaker between the at least two buses.

18. The method of claim 15, comprising:

receiving inputs comprising at least one of breaker status, load values, and transformer taps; and generating the system frequency based at least in part on the received inputs being used in the system dynamic model.

19. The method of claim 15, wherein the system frequency is calculated using an equation:

$$\sum_{j=1}^{N_{Gi}} Pm_{j,i}^{t+\Delta t} = \sum_{j=1}^{N_{gi}} 2*H_j \frac{f^{t+\Delta t} - f^t}{\Delta t} +$$

$$g_i^P(f^{t+\Delta t}, V^{t+\Delta t})P_{Load_i} + |V_i^{t+\Delta t}|\sum_{n=1}^{N} |Y_{in}||V_n^{t+\Delta t}|\cos(\delta_i^{t+\Delta t} - \delta_n^{t+\Delta t} - \theta_{in})$$

where $N_{Gi}$ is the number of generators connected to bus I, $Pm_{j,i}$ is the mechanical power of generator j which is connected to bus i, $H_j$ is the inertia of generator j, f is the system frequency, $g_i^P$ is a function from the load frequency and voltage characteristics of loads in the simulated power system, $Pload_i$ is active power connected to bus i at nominal frequency and voltage, $|V_i|$ and $|V_n|$ are bus voltage magnitudes of bus i and bus n, $|Y_{in}|$ and $\theta_{in}$ are the magnitude and angle of $Y_{in}$, the (i,n)th element of a bus admittance matrix.

* * * * *